US007453764B2

(12) United States Patent  
Cavalca et al.

(10) Patent No.: US 7,453,764 B2  
(45) Date of Patent: Nov. 18, 2008

(54) METHOD OF IMAGING IN AN UNDERGROUND FORMATIONS STEEP-SLOPING GEOLOGIC INTERFACES, GIVING RISE TO PRISMATIC REFLECTIONS

(75) Inventors: Maud Cavalca, Colombes (FR); Patrick Lailly, Pau (FR)

(73) Assignee: Institut Farncais du Petrole, Ruiel Malmaison Cedex (FR)

( * ) Notice: Subject to any disclaimer, the term of this patent is extended or adjusted under 35 U.S.C. 154(b) by 205 days.

(21) Appl. No.: 11/086,443

(22) Filed: Mar. 23, 2005

(65) Prior Publication Data

US 2005/0222773 A1 Oct. 6, 2005

(30) Foreign Application Priority Data

Mar. 23, 2004 (FR) .................................. 04 02977

(51) Int. Cl.  
*G01V 1/28* (2006.01)
(52) U.S. Cl. .............................. 367/38; 367/37; 367/47; 367/53
(58) Field of Classification Search .................. 367/37, 367/38, 47, 53, 57  
See application file for complete search history.

(56) References Cited

U.S. PATENT DOCUMENTS

| 4,987,561 A | | 1/1991 | Bell |
| 5,307,268 A | * | 4/1994 | Wang et al. .................... 702/16 |
| 7,110,323 B2 | * | 9/2006 | Marmalyevskyy et al. .... 367/37 |

FOREIGN PATENT DOCUMENTS

DE 3015869 * 11/1980

OTHER PUBLICATIONS

Cavalca, et al. Towards the tomographic inversion of prismatic reflections. KIM 2001 Annual Report.*

Bishop T.N., Bube K., Cutler R., Langan R., Love P., Resnick J., Shuey R., Spindler D., Wyld H.: "Tomographic determination of velocity and depth in laterally varying media" Geophysics, vol. 50, No. 6, 1985, pp. 903-923, XP-002196294.

Hale D., Hill N., Stefani J.: "Imaging salt with turning seismic waves" Geophysics, vol. 57, No. 11, 1992, pp. 1453-1462, XP-002196295.

Ratcliff D., Gray S., Whitmore N.: "Seimic imaging of salt structures in the gulf of Mexico" Geophysics: The Leading Edge of Exploration, 1992, pp. 15-31, XP-002196296.

* cited by examiner

*Primary Examiner*—Jack W Keith  
*Assistant Examiner*—Scott A Hughes  
(74) *Attorney, Agent, or Firm*—Antonelli, Terry, Stout & Kraus, LLP.

(57) ABSTRACT

A method of imaging in an underground formation one or more steep-sloping geologic interfaces, which are not necessarily in a plane, by forming with primary reflectors, which are not necessarily in a plane, dihedra giving rise to prismatic seismic reflections (double reflections). The geometry of the steep-sloping interface is determined from choosing seismic records of one or more events corresponding to prismatic reflections for different source-pickup pairs of an acquisition device. A new reflection tomography technique is used, wherein introduction of specific constraints guarantees the convergence of the algorithm. The velocity distribution in the geologic formation and/or the geometry of the interface(s) between the sedimentary layers can be known otherwise or determined by means of the method. The method can apply to a formation comprising several different sloping interfaces.

27 Claims, 3 Drawing Sheets

METHOD OF IMAGING IN AN UNDERGROUND FORMATIONS STEEP-SLOPING GEOLOGIC INTERFACES, GIVING RISE TO PRISMATIC REFLECTIONS

BACKGROUND OF THE INVENTION

1. Field of the Invention

The present invention relates to a method of imaging steep-sloping geologic interfaces such as faults or salt dome flanks, using seismic reflections referred to as prismatic reflections.

2. Description of the Prior Art

Prismatic reflections are understood to be double reflections whose impact points are located on the two faces, not necessarily in a plane, of a dihedron, thus forming a ray with three "branches". Each dihedron is a steep-sloping interface resulting from a structural irregularity of the subsurface (a fault for example) and "primary reflectors". "Primary reflectors" are understood to be the interfaces corresponding to the boundaries of sedimentary deposits. Prismatic reflections therefore carry information on the geometry of the steep-sloping interface. Like any reflection observed for various source-pickup pairs, prismatic reflections also carry information on the velocity distribution in the subsurface.

Reflection shooting is widely used for oil exploration. As the name indicates, to provide images of the subsurface, reflection shooting extracts the information contained in the seismic events that undergo a single reflection on the geologic interfaces. Primary reflection events are of the type where the reflection from the interface is a primary reflector. Other events, in particular multiple reflections, are often considered to be noise likely to disturb seismic imaging techniques. It is therefore generally desired to eliminate multiple reflections.

Primary reflections generally do not allow obtaining an image from steep-sloping events such as faults and salt dome flanks, especially if they are overhanging. For example, in FIG. 1 showing a section extracted from a poststack 3D migrated volume, a salt dome can be recognized. The position of the top of the dome can be clearly seen. On the other hand, the position of the flanks and of the base is indefinite. This FIG. 1 illustrates the limits encountered by conventional processing based on the use of primary reflections for imaging the flanks of a salt dome. Certain uses of diving waves, which have sometimes been used to image such structures in the Gulf of Mexico as described, for example, in U.S. Pat. No. 5,235,555, can however be noted. However, the existence of such waves requires a particular configuration of the velocity distribution in the subsurface.

Prismatic waves, which are a particular case of multiple reflections, are encountered much more commonly, notably in geometries where the geologic interfaces are steep-sloping. Various examples of such events are for example described in the following publication:

Hawkins, K., 1994, "The Challenge presented by North Sea Central Graben Salt Domes to all DMO Algorithms": First Break, 12, No. 6, 327-343. They are considered to be noise to be eliminated.

Using the information contained in these prismatic reflections in order to obtain information on the geometry of steep-sloping interfaces has already been considered by D. W. Bell in U.S. Pat. No. 4,987,561 in cases where the primary interfaces and the sloping reflectors are in a plane and are perpendicular to one another.

Another approach, which is complex to implement because of its lack of reliability, has also been considered by P. Lailly and K. Broto ("Towards the Tomographic Inversion of Prismatic Reflections", $71^{1st}$ Ann. Internat. Mtg., Soc. Expl. Geophys., Expanded Abstract, 726-729, 2001). It is based on the well-known reflection traveltime tomography technique, described for example in the following document:

Bishop, T., et al., 1985, "Tomographic Determination of Velocity and Depth in Laterally Varying Media", Geophysics, 50 No. 6, 903-923.

SUMMARY OF THE INVENTION

The method according to the invention uses the information contained in prismatic reflections in order, for example, to image certain steep-sloping interfaces while overcoming the problems linked with the structural complexity of the models (interfaces that are not necessarily in a plane and perpendicular to one another), reliability problems and the difficulty in the implementation of a conventional reflection tomography.

The invention is a method for providing an image in an underground formation of at least one steep-sloping geologic interface formed with primary reflectors dihedra whose faces are not necessarily plane and which give rise to prismatic seismic reflections. The method is implemented from time-dependent records of waveforms received by seismic receivers coupled with the formation, in response to the emission of seismic waves in the subsoil by a seismic source. The method comprises the following:

determining a velocity distribution in a geologic formation, as well as a geometry of each primary reflector contributing to a formation of prismatic reflections;

choosing on seismic records arrival times of seismic events corresponding to prismatic reflections impacting, on one hand, a steep-sloping geologic interface and, on another hand, the primary reflectors, for various source-pickup pairs of an acquisition device;

forming an arrival time vector $T^{pick}$ from traveltimes corresponding to signatures; and applying a reflection traveltime tomography technique comprising constraints guaranteeing an existence of a ray for each signature, to determine a geometry of the steep-sloping interface.

According to the invention, determining the velocity distribution and/or the geometry of each primary reflector contributing to the formation of prismatic reflections can also require choosing, on the seismic records, arrival times of the primary reflections associated with the primary reflectors prior to applying the traveltime tomography technique.

According to the invention, it is possible to image several steep-sloping geologic interfaces of the formation by forming an arrival time vector by concatenation of the traveltimes corresponding to the prismatic reflections associated with the various interfaces.

According to the invention, the tomography technique, with imposed constraints, can comprise an optimization by constraint penalization.

According to the invention, the imposed constraints are obtained by seeking the path along which the traveltime is a minimum by imposing at impact points position constraints on reflectors which satisfy the signature which is considered.

According to the invention, the constraints to be imposed on the model can be expressed as nullity constraints of vectors $\vec{G}_{kj}$ whose components are associated with the various signatures and whose respective values are those of a gradient of the traveltime with respect to the independent coordinates of the various impact points of the paths.

BRIEF DESCRIPTION OF THE DRAWINGS

Other features and advantages of the method according to the invention will be clear from reading the description hereafter, given by way of non limitative example, with reference to the accompanying figures wherein.

DETAILED DESCRIPTION OF THE INVENTION

Figure 1:
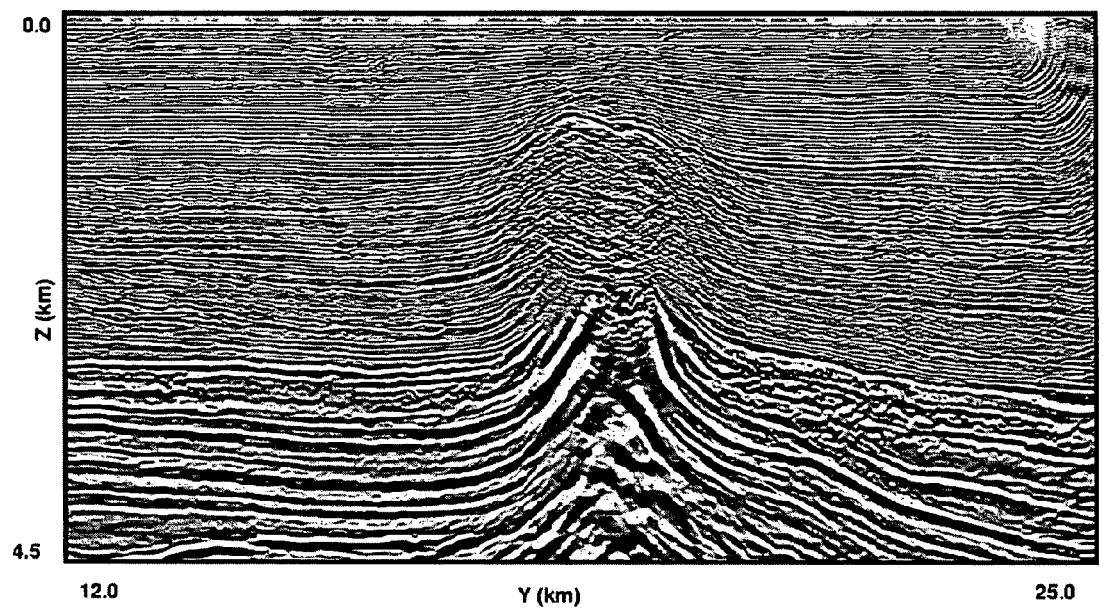
FIG. 1 is a seismic section extracted from a poststack 3D migrated volume where a salt dome can be observed.

Available are seismic records which are obtained by means of a seismic device comprising a seismic source emitting seismic waves that are propagated in the subsoil, a set of seismic receivers coupled with the medium which pick up the waves reflected by the subsoil discontinuities in response to the waves emitted, and a laboratory for recording the seismic signals which are picked up.

The method according to the invention uses the information contained in the prismatic reflections in order to image certain steep-sloping interfaces, whatever the structural complexity of the model. The method uses a new reflection traveltime tomography technique.

The conventional tomography technique solves the inverse problem of ray tracing in a subsurface model. Here, a subsurface model m is described by a predetermined number of layers, a velocity distribution within each layer, and a geometry of the interfaces that may separate these layers and/or constitute reflectors.

An interpretation of the seismic data allows choosing the arrival times of different seismic events, among which prismatic reflections, for a series of signatures, that is for a set of triplets:

a specification of a seismic event, that is of a sequence of interfaces on which a reflection occurs; and a source-pickup pair for which a specified seismic event is observed.

The chosen arrival times can be grouped together in a vector referred to as $T^{pick}$ with a component of the vector corresponding to a specific signature.

The goal of reflection traveltime tomography is finding a model $\tilde{m}$ accounting for the arrival times $T^{pick}$. The concept is for a given model m, calculating by ray tracing, or any other technique related to geometric optics, the arrival times corresponding to various signatures. A calculated arrival time vector $T^{calc}$ (m) is then formed ($T^{calc}$ being here the modelling operator). The model m which best accounts for the arrival times $T^{pick}$ is obtained by seeking model which minimizes the least-squares function:

$$C(m)=\|T^{calc}(m)-T^{pick}\|^2 \qquad (1)$$

where $\| \; \|$ designates a norm in the vector space of the arrival times (the dimension of this vector space being the number of signatures considered).

Various sophistications can be introduced, such as addition of regularization terms to the above function (Delprat-Jannaud F., and Lailly P., 1993, "III-Posed and Well-Posed Formulations of the Reflection Traveltime Tomography Problem": J. Geophys. Res., 98, 6589-6605), or the use of the formalism of the slope tomography methods (Billette F., Lambaré G., 1998, "Velocity Macromodel Estimation by Stereotomography", Geophys. J. Int., 135, 671-690). However, reflection traveltime tomography basically solves the above problem.

However, in a case of complex models, it may occur that no ray is associated with certain signatures. In this case, the function (1) above is not defined for the models in question because modelling operator $T^{calc}$ is not defined. Trying to minimize the operator thus becomes meaningless. In fact, in practice, implementation of a tomography software by means of Gauss-Newton type methods (which are the most commonly used) leads to an iterative construction of a sequence of models where rays appear or disappear in an uncontrolled way, which prevents any convergence to the desired solution ($\tilde{m}$).

The method according to the invention uses the information contained in prismatic reflections in order to obtain an image of certain steep-sloping interfaces using a new reflection traveltime tomography technique allowing, by means of specific constraints, restriction of the optimization to all of the allowable models (models for which the modelling operator is defined).

A possible implementation of the method is presented in cases where it is desired to determine, from the seismic records obtained beforehand for an underground zone, the geometry of at least one steep-sloping interface using arrival times of prismatic waves, the velocity distribution in the geologic formation and the geometry of the primary reflector (s) contributing to the formation of the prismatic reflection(s) (information required for imaging the steep-sloping interface) being known or having been estimated otherwise. The operations described hereafter are then carried out.

Figure 2:
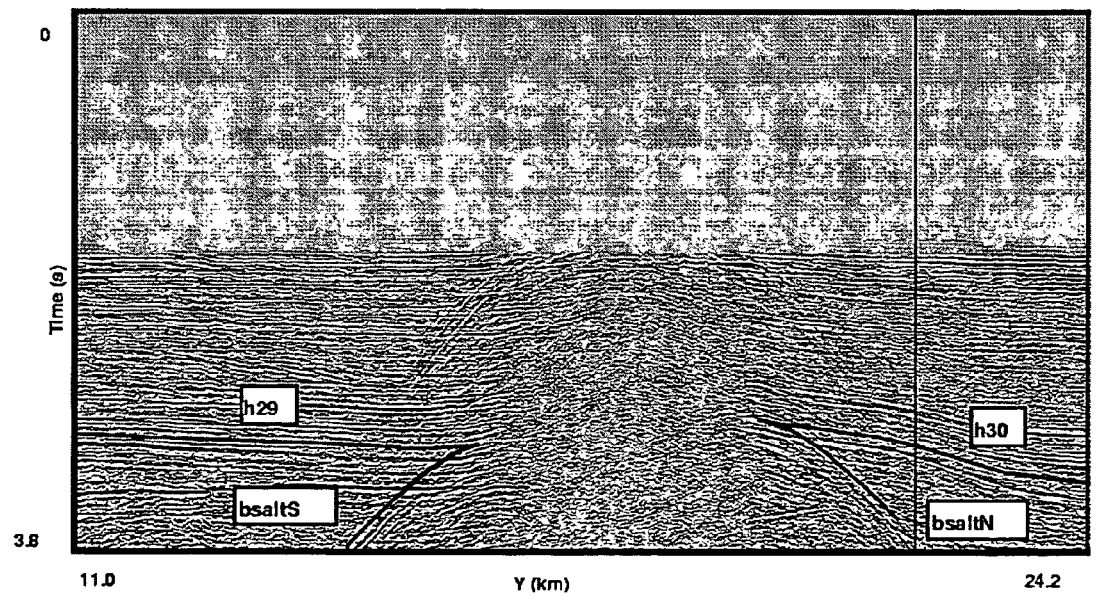
FIG. 2 shows, in a section extracted from an iso-offset cube with a 1800-m offset, the choice (in 3D inside this cube) of two prismatic reflections (bsaltS and bsaltN) and of the associated primary reflections (h29 and h30)

First, one or more events corresponding to prismatic reflections are chosen on the available seismic records, for various source-pickup pairs of the acquisition device. These events can be associated with different primary reflectors but with a single steep-sloping interface (to be imaged). The event bsaltS of FIG. 2 shows the choice of a prismatic reflection.

Then a vector $T^{pick}$, whose components represent the chosen arrival times of the prismatic reflections, is formed. These components are associated with the various signatures (source, receiver, event).

A reflection traveltime tomography technique comprising imposed constraints which guarantee the existence of a ray for each signature that is considered is then utilized to deduce the geometry of the steep-sloping interface.

One way of reaching this objective is by minimizing the least-squares function (1) by restricting the minimization to all of the allowable models, that is all of the models for which there is a ray associated with each signature. This operation comprises using a suitable optimization method with constraints (such as those described in: Nocedal, J., Wright, S. J., Numerical Optimization, Springer, 1999), these methods including those involving a constraint penalization. The constraints to be imposed then remain to be explained.

Figure 3:
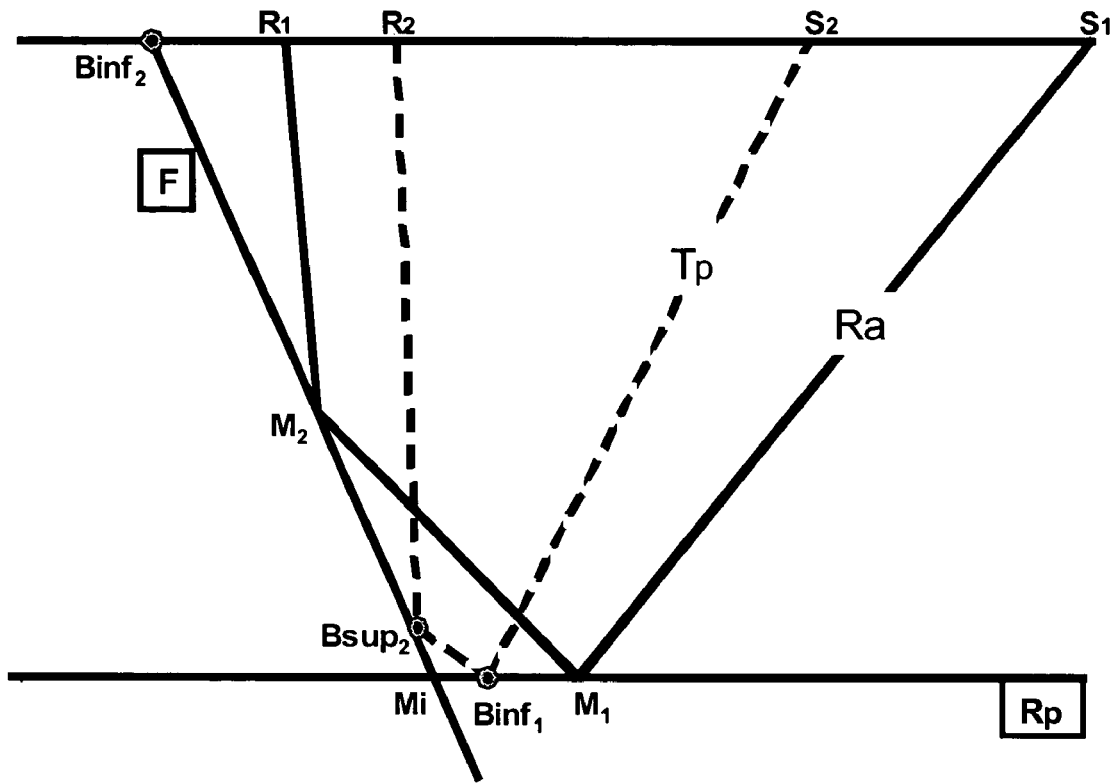
FIG. 3 shows, in a 2D case, the boundary constraints on the position of impact points introduced in the direct problem.

According to the invention, one way of explaining these constraints requires a definition of a new modelling operator $T^{new}$ associated with a new direct problem illustrated by FIG. 3. In this new direct problem, the path respecting the signature considered along which the traveltime is minimum is desired for each signature. This path is not necessarily a ray. The traveltimes along these paths define the image vector of the model considered by the new modelling operator $T^{new}$. Such paths have three segments the succession of which connects source (S1) and receiver (R1) via impact points $M_1$ and $M_2$. Impact point $M_1$ is positioned on primary reflector Rp and impact point $M_2$ is positioned on the steep-sloping reflector (fault) F. In order to examine the signature, impact points $M_1$ and $M_2$ have to be on the right side in relation to point Mi (intersection point of Rp and F forming the dihedron), and each one on their respective interface. In order to find the path giving the minimum traveltime, a minimization problem has to be solved, the unknowns being the position of impact points $M_1$ and $M_2$. To satisfy the signature, boundary constraints on these unknowns are imposed during the minimization problem. Boundaries (Binf1 and Bsup2) slightly offset in relation to Mi are imposed as a security measure in the example illustrated by FIG. 3.

After solving this new direct problem, a path will form a ray (Ra in FIG. 3) if the model allows it, that is if, for the source-receiver pair (S1/R1) considered, there actually is a prismatic reflection. In this case, a gradient of the traveltime, as a function of the position of the impact points, will be zero. But the solution can also form a path referred to as "pathological" (Tp in FIG. 3, for pair S2/R2) in cases where the impact points are blocked by the boundary constraint. The gradient defined above will therefore not be zero. This path is referred to as pathological insofar as it does not satisfy the Fermat principle: it therefore does not constitute a ray.

The constraints to be imposed on the model are then expressed as nullity constraints of the sequence of vectors $\vec{G}_{kj}$ whose components, associated with the various signatures, have as their values those of the gradient of the traveltime with respect to the j-th independent coordinate of impact point $M_k$.

In the implementation described, the optimization method with imposed constraints used is a method involving a constraint penalization. This means that function (1) takes the following form $$C^{new}(m) = \|T^{new}(m) - T^{pick}\|^2 + \frac{1}{\varepsilon}\sum_{k=1}^{2}\sum_{j=1}^{n}\|\vec{G}_{kj}\|^2 \begin{cases} n = 2(3D) \\ n = 1(2D) \\ \varepsilon \text{ selected small enough} \end{cases} \quad (2)$$

Penalization of the constraints (vectors $\vec{G}_{kj}$) allows modification of the steep-sloping interface (the fault in our example) until an allowable model is obtained. Other optimization methods with constraints can of course be considered within the scope of the method according to the invention.

Figure 4A:
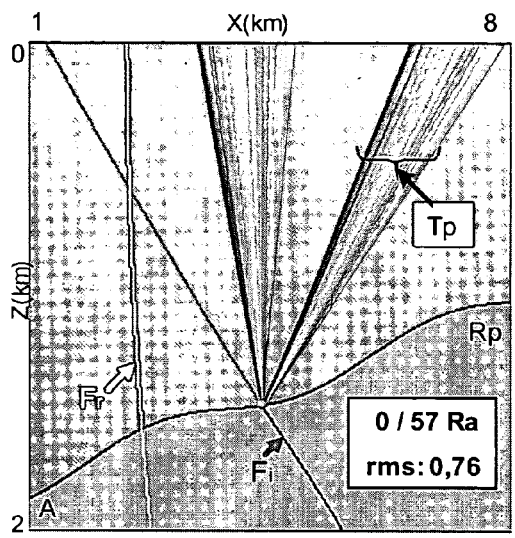
FIGS. 4A, 4B, 4C and 4D illustrate, for a 2D fault model case, the tomography method with imposed constraints according to the invention, so as to guarantee that the modelling operator $T^{new}$ is defined for all the signatures.
Figure 4B:
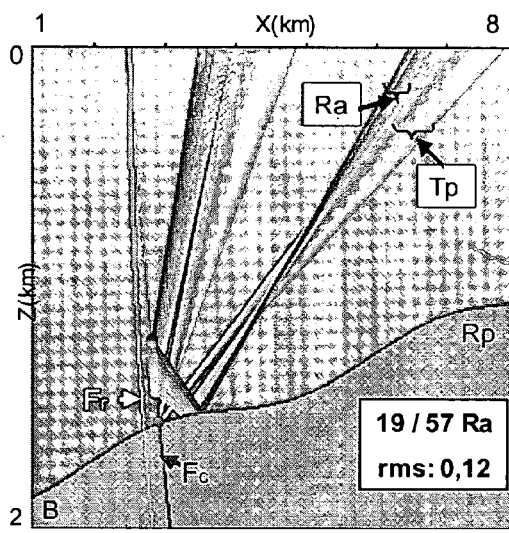
Figure 4C:
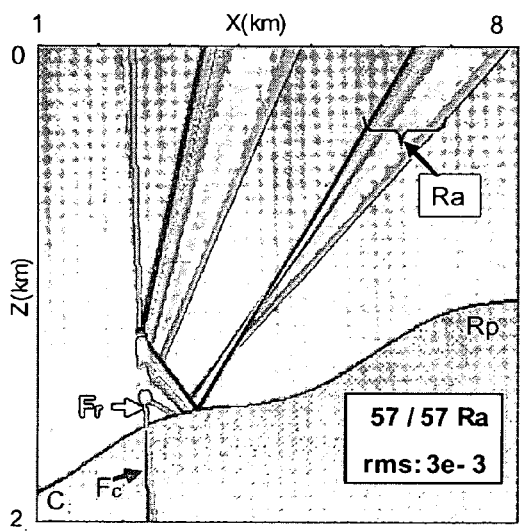
Figure 4D:
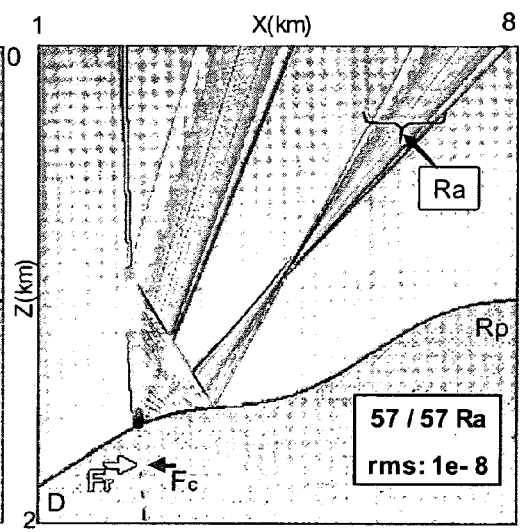

FIGS. 4A, 4B, 4C and 4D give an example of a result obtained by implementing the traveltime tomography method with imposed constraints. Minimization of $C^{new}$ is carried out by a Gauss-Newton type iterative algorithm. FIG. 4A shows the initial model. The geometry of the initial fault (Fi) is very far from that of the real fault (Fr). This model is not allowable insofar as there is no prismatic reflection (no ray) for all of the 57 signatures considered. All the paths are pathological (0 calculated rays out of 57 possible rays). FIG. 4B shows the result obtained on the $3^{rd}$ iteration, where 19 rays can be calculated. Then, FIG. 4C illustrates the result of the $4^{th}$ iteration where 57 rays were calculated. These two figures thus illustrate the convergence of the method to an allowable model (57/57 rays). Adjustment on the chosen times, that is adjustment between the real fault (Fr) and the calculated fault (Fc), is obtained on the $14^{th}$ iteration, as illustrated by FIG. 4D. The rms value appearing in FIGS. 4A, 4B, 4C and 4D gives the root mean square value of the residues between the chosen times and the calculated times for the various signatures. It can be noted that this value is practically zero for iteration 14, which makes a nearly perfect adjustment between the calculated fault (Fc) and the real fault (Fr) possible.

If the geometry of the primary reflector(s) contributing to the formation of the prismatic reflection(s) (information required for imaging the steep-sloping interface) is not known, it can be determined by picking also the primary reflections on the primary reflectors contributing to generation of the chosen prismatic reflections. FIG. 2 illustrates the choosing of the primary reflection (event h29) associated with the prismatic reflection bsaltS. This tomography technique also allows determination of the velocity distribution in the geologic formation: the arrival times then have to be chosen for several offsets.

The case of a single steep-sloping interface associated with one or more primary reflectors has been considered so far. Prismatic reflections generated by various sloping interfaces could be similarly used without departing from the scope of the invention to represent the geometry of several such interfaces. Thus, in FIG. 2, it is possible to use simultaneously the prismatic reflection formed by the sloping reflector bsaltS (associated with the primary reflector h29) and the prismatic reflection formed by the sloping reflector bsaltN (associated with the primary reflector h30). In this case, vector $T^{pick}$ is formed by concatenation of the arrival times corresponding to all the prismatic events.

The invention claimed is:

1. A method of imaging, in an underground formation, at least one steep sloping geologic interface forming with primary reflectors dihedra whose faces are not necessarily plane and giving rise to prismatic seismic reflections, from time-dependent seismic records of waveforms received by seismic receivers coupled with the formation, in response to the emission of seismic waves in a subsoil by a seismic source, comprising:

determining a subsurface model described by a velocity distribution in the formation, and a geometry of each primary reflector contributing to the formation of the prismatic seismic reflections;

choosing on the seismic record arrival times of seismic events corresponding to prismatic seismic reflections impacting at impact points on the sloping geologic interface and on each primary reflector, for source-pickup pairs of the seismic receivers;

forming an arrival time vector from traveltimes corresponding to signatures; and constructing an image of the subsoil by applying a reflection traveltime tomography technique to determine geometry of the at least one steep sloping interface; and wherein the reflection traveltime tomography technique comprises:

minimizing a difference between traveltimes generated by tracing rays through the subsurface model and traveltimes forming the arrival time vector; and constraining the minimization by guaranteeing an existence of a ray for each signature which is considered by means of constraints defined by seeking the path along which the traveltime is a minimum by imposing at the impact points position constraints on the reflectors so as to satisfy the signature which is considered.

2. A method as claimed in claim 1, wherein determining at least one of the velocity distribution and the geometry of each primary reflector contributing to formation of the prismatic seismic reflections also requires choosing, on the seismic records, arrival times of the primary reflections associated with the primary reflectors prior to applying the traveltime tomography technique.

3. A method as claimed in claim 2, wherein sloping geologic interfaces of the formation are imaged by forming an arrival time vector by concatenation of traveltimes corresponding to the prismatic seismic reflections associated with the interfaces.

4. A method as claimed in claim 3, wherein the tomography technique with imposed constraints comprises an optimization by constraint penalization.

5. A method as claimed in claim 4, wherein the constraints to be imposed are expressed as nullity constraints of vectors whose components are associated with the signatures and whose respective values are those of traveltime gradients with respect to independent coordinates of the impact points.

6. A method as claimed in claim 4, wherein the at least one steep sloping geologic interface is not plane.

7. A method as claimed in claim 3, wherein the constraints to be imposed are expressed as nullity constraints of vectors whose components are associated with the signatures and whose respective values are those of traveltime gradients with respect to independent coordinates of the impact points.

8. A method as claimed in claim 3, wherein the at least one steep sloping geologic interface is not plane.

9. A method as claimed in claim 2, wherein the tomography technique with imposed constraints comprises an optimization by constraint penalization.

10. A method as claimed in claim 9, wherein the constraints to be imposed are expressed as nullity constraints of vectors whose components are associated with the signatures and whose respective values are those of traveltime gradients with respect to independent coordinates of the impact points.

11. A method as claimed in claim 9, wherein the at least one steep sloping geologic interface is not plane.

12. A method as claimed in claim 2, wherein the constraints to be imposed are expressed as nullity constraints of vectors whose components are associated with the signatures and whose respective values are those of traveltime gradients with respect to independent coordinates of the impact points.

13. A method as claimed in claim 2, wherein the at least one steep sloping geologic interface is not plane.

14. A method as claimed claim 1, wherein sloping geologic interfaces of the formation are imaged by forming the arrival time vector by concatenation of traveltimes corresponding to the prismatic seismic reflections associated with the interfaces.

15. A method as claimed in claim 14, wherein the tomography technique with imposed constraints comprises an optimization by constraint penalization.

16. A method as claimed in claim 15, wherein the constraints to be imposed are expressed as nullity constraints of vectors whose components are associated with the signatures and whose respective values are those of traveltime gradients with respect to independent coordinates of the impact points.

17. A method as claimed in claim 15, wherein the at least one steep sloping geologic interface is not plane.

18. A method as claimed in claim 14, wherein the constraints to be imposed are expressed as nullity constraints of vectors whose components are associated with the signatures and whose respective values are those of traveltime gradients with respect to independent coordinates of the impact points.

19. A method as claimed in claim 14, wherein the at least one steep sloping geologic interface is not plane.

20. A method as claimed in claim 1, wherein the tomography technique with imposed constraints comprises an optimization by constraint penalization.

21. A method as claimed in claim 20, wherein the constraints to be imposed are expressed as nullity constraints of vectors whose components are associated with the signatures and whose respective values are those of traveltime gradients with respect to independent coordinates of the impact points.

22. A method as claimed in claim 20, wherein the at least one steep sloping geologic interface is not plane.

23. A method as claimed in claim 1, wherein the constraints to be imposed are expressed as nullity constraints of vectors whose components are associated with the signatures and whose respective values are those of traveltime gradients with respect to independent coordinates of the impact points.

24. A method as claimed in claim 23, wherein the constraints to be imposed are expressed as nullity constraints of vectors whose components are associated with the signatures and whose respective values are those of traveltime gradients with respect to independent coordinates of the impact point.

25. A method as claimed in claim 23, wherein the at least one steep sloping geologic interface is not plane.

26. A method as claimed in claim 23, wherein the tomography technique with imposed constraints comprises an optimization by constraint penalization.

27. A method as claimed in claim 1, wherein the at least one steep sloping geologic interface is not plane.

* * * * *